United States Patent
Vilim et al.

(10) Patent No.: US 8,930,165 B2
(45) Date of Patent: Jan. 6, 2015

(54) SOURCE LOCALIZATION USING MULTIPLE UNITS OF A TIGHT-PITCHED DETECTOR ARRAY

(75) Inventors: Richard B. Vilim, Sugar Grove, IL (US); Raymond T. Klann, Channahon, IL (US)

(73) Assignee: UChicago Argonne, LLC, Chicago, IL (US)

( * ) Notice: Subject to any disclaimer, the term of this patent is extended or adjusted under 35 U.S.C. 154(b) by 329 days.

(21) Appl. No.: 12/881,943

(22) Filed: Sep. 14, 2010

(65) Prior Publication Data

US 2011/0246137 A1   Oct. 6, 2011

Related U.S. Application Data

(60) Provisional application No. 61/319,819, filed on Mar. 31, 2010, provisional application No. 61/333,646, filed on May 11, 2010.

(51) Int. Cl.
| | | |
|---|---|---|
| *G06F 19/00* | (2011.01) | |
| *G01T 1/29* | (2006.01) | |
| *G06F 17/18* | (2006.01) | |
| *G01T 7/00* | (2006.01) | |

(52) U.S. Cl.
CPC ............... *G01T 7/00* (2013.01); *G01T 1/2907* (2013.01)

USPC ............... 702/181; 250/336.1; 250/370.1

(58) Field of Classification Search
CPC ........................................... G06F 17/18
USPC ............... 702/181; 250/267, 336.1, 393
See application file for complete search history.

(56) References Cited

U.S. PATENT DOCUMENTS

| | | | |
|---|---|---|---|
| 6,545,281 B1 * | 4/2003 | McGregor et al. | 250/370.05 |
| 7,465,924 B1 * | 12/2008 | Klann et al. | 250/336.1 |
| 7,468,516 B2 * | 12/2008 | Smither | 250/393 |

OTHER PUBLICATIONS

U.S. Appl. No. 12/881,928, filed Sep. 14, 2010, Vilim et al.

* cited by examiner

*Primary Examiner* — Patrick Assouad
*Assistant Examiner* — Haidong Zhang
(74) *Attorney, Agent, or Firm* — Foley & Lardner LLP

(57) ABSTRACT

A system and method for determining a probability of the location of an illicit radiation source within an environment based on directional detectors. An embodiment includes a plurality of directional radiation detectors distributed about the environment and integrated with a processing unit adapted to determine the probability of the source location based on the radiation count data received from the plurality of detectors. The processing unit is further adapted to output information indicative of the location of the radiation source within the environment.

20 Claims, 8 Drawing Sheets

SOURCE LOCALIZATION USING MULTIPLE UNITS OF A TIGHT-PITCHED DETECTOR ARRAY

CROSS REFERENCE TO RELATED PATENT APPLICATIONS

The present application claims priority to U.S. Provisional Patent Application Nos. 61/319,819, filed Mar. 31, 2010, and 61/333,646, filed May 11, 2010, the contents of each of which are incorporated herein by reference in their entirety.

GOVERNMENT INTEREST

The United States Government has rights in this invention pursuant to Contract No. DE-AC02-06CH11357 between the United States Government and the UChicago Argonne, LLC, representing Argonne National Laboratory.

FIELD OF THE INVENTION

This invention is directed to systems and methods for detecting a radiation source. More particularly, the invention is directed to obtaining a probabilistic estimate of a location of an illicit radiation source within an environment.

BACKGROUND OF THE INVENTION

This section is intended to provide a background or context to the invention that is, inter alia, recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Illicit radioactive material can potentially appear in a wide range of public venues. Large national public events are routinely monitored for such radioactive sources. One element in a plan for managing such threats involves searching for sources in venues at risk and tracking the sources in real time when they are detected. A radiation source that can be tracked unobtrusively potentially yields useful information such as the purveyor's identity and, for future threat reduction, the means by which the source was deployed. In addition, real-time incident-specific information is of use to on-site security personnel.

Two examples of environments that can benefit from monitoring include the confined-venue (e.g. a stadium or a convention center) and the wide-area venue. In the confined-venue problem pedestrian traffic enters through a limited number of entrances or what are effectively choke points. Screening for radiation sources can generally be achieved with a few radiation detectors located proximate the choke points. For example, because the distances are relatively short, allowing coverage by a few well placed fixed detectors, thereby eliminating the manpower requirements of mobile detectors, integrated fixed isotropic detectors may be used. On the other hand, in the wide-area problem access to the venue is less controlled both in time and space. For example, a ship boarding party inspecting a vessel and its cargo whose disposition is not well characterized is unable to take advantage of choke points to locate a radiation source. Further examples of wide-area problems include large open-air events, such as an inauguration, having many pedestrian approaches, some of which are large spaces with no choke point. The differences between the confined-venue problem and the wide-area problem have implications for the types of detectors most suited for monitoring of radiation sources within those environments.

A directional-detector array is generally known within the nuclear threat-reduction community. Such a radiation detector array may process measured count data by taking simple ratios of counts without treatment of various uncertainties and ambient conditions within the environment. Significantly, existing radiation detection systems are not capable of estimating an (x,y) position for a radiation source. Although existing directional detectors can estimate a direction, they cannot provide a probability of locating a source as a function of direction. Current directional-detector technology is further limited as such systems generally operate as a standalone unit without the capability for sharing data among several units to improve the accuracy of the source position estimate. Existing directional detection methods also do not provide an estimate for direction uncertainty. Other directional detectors, including the Compton-scattering camera, the coded-aperture imager, and positron emission backscatter imaging, suffer from similar deficiencies.

Accordingly, there is a need to improve current radiation detection, search and tracking capabilities while reducing the cost of the detection equipment and deployment of the equipment. To date, emphasis has largely been placed on developing and engineering advanced detector materials to provide greater measurement sensitivity. More recently, the use of various algorithms to tease more information out of detector signals has received interest. One such area involves combining the signals from multiple detectors to improve sensitivity and the position estimate. However, many existing systems provide only a simple alarming capability on a detector-by-detector basis and leave it to the operator to infer source position. Additionally, a fundamental problem that generally underlies radiation source tracking is an inability to achieve acceptable position estimate accuracy in an environment where the signal-to-noise ratio is low, which may preclude obtaining an estimate of the source position.

SUMMARY

Various embodiments of the present systems and methods incorporate radiation detection and processing, of statistical and deterministic phenomena, to generate a statistically qualified best estimate for source direction employing a single directional detector. In other embodiments, multiple detector units operating in an integrated fashion yield information describing source location and location uncertainty. While conventional detectors that use a single detector element to seek out a source lack directional capability, the present directional detectors are configured to provide the operator with an indication of the direction to the source. Additionally, various embodiments of the present systems and methods address a fundamental problem that underlies source tracking: achieving acceptable position estimate accuracy in an environment where the signal-to-noise ratio is so low that it may often preclude being able to estimate the source position using conventional methods. This problem may be solved by using directional-detector arrays with advanced signal analysis algorithms and integration of multiple detectors to increase the signal-to-noise ratio.

Signals from multiple and different types of detectors—fixed versus mobile and isotropic versus directional as dictated by the unique requirements of the environment and circumstance—can be integrated to increase overall sensitivity per unit equipment and manpower cost. For example, the wide-area problem may be economically approached using a combination of fixed-isotropic and mobile and/or fixed directional detectors. Using only the former type, the large area, compared to the range of a detector, necessitates many detectors with the added problem that they interfere with the normal use of the venue space. A more practical solution involves a combination of a number of fixed-isotropic detectors to cover heavily trafficked paths and fixed and/or mobile directional detectors that provide a search capability to home in on a source. Source tracking using multiple directional detectors in a probabilistic framework may also be used. Such an arrangement can subsume isotropic non-directional detectors. Although it is assumed that the position and orientation of the various directional detectors is known, it does not matter whether the detectors are mobile or fixed.

Various embodiments include a standalone directional detector that present a probability of locating a source as a function of direction. Other embodiments include multiple integrated directional detectors that provide a probability of finding a source as a function of position. The present embodiments offer several advantages, including, in the case of a standalone unit, a precise statement of direction including an estimate of direction uncertainty, and, in the case of a networked system of multiple directional-detector arrays, a more accurate position estimate and a more precise statement of position including an estimate of position uncertainty.

In an embodiment, a radiation detection system for obtaining a location of a radiation source within an environment comprises at least one directional detector positionable within an environment and angularly orientatable in relation to the environment. The at least one directional detector is configured to detect gamma-ray radiation emitted from a source at an unknown location within the environment and distal from the position of the at least one directional detector. A processing unit in communication with the at least one directional detector is configured to receive radiation count data from the at least one directional detector. The processing unit is adapted to determine a probability of a direction to the source relative to the at least one directional detector based on the radiation count data obtained at a plurality of angles of the directional detector. The system further includes an output unit in communication with the processing unit. The output unit is adapted to report information indicative of the probability of the direction to the source relative to the position of the at least one directional detector.

In another embodiment, a method for determining the location of a radiation source within an environment comprises positioning within an environment at least one directional detector array. The directional detector array includes a plurality of detector elements configured to detect radiation emitted by a source disposed at an unknown location within the environment. The method further comprises operating the at least one directional detector array at its position to partially occlude source radiation from at least one of the plurality of detector elements. Radiation counts are acquired for each of the detector elements of the at least one directional detector array. The method further includes processing the radiation counts from each of the detector elements with a processing unit to determine a probability density function for a direction to the source in relation to the position of the at least one directional detector array. The method may further comprise outputting information indicative of the direction to the source relative to position of the at least one directional detector array via an output unit.

In yet another embodiment, a computer readable product for determining a location of a radiation source within an environment comprises machine readable program code for causing, when executed, a method that comprises receiving radiation count data from at least one directional detector configured to detect radiation count data emitted by a source having a unknown location and unknown energy and receiving detector information, the detector information including a position and an angular orientation of the at least one directional detector with respect to the environment. The method further comprises generating a probability density function of a direction to the source in relation to the position of the at least one directional detector based on the radiation count data and the detector information and outputting information representative of the direction to the source from the at least one directional detector based on the probability density function.

These and other objects, advantages, and features of the invention, together with the organization and manner of operation therefore, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
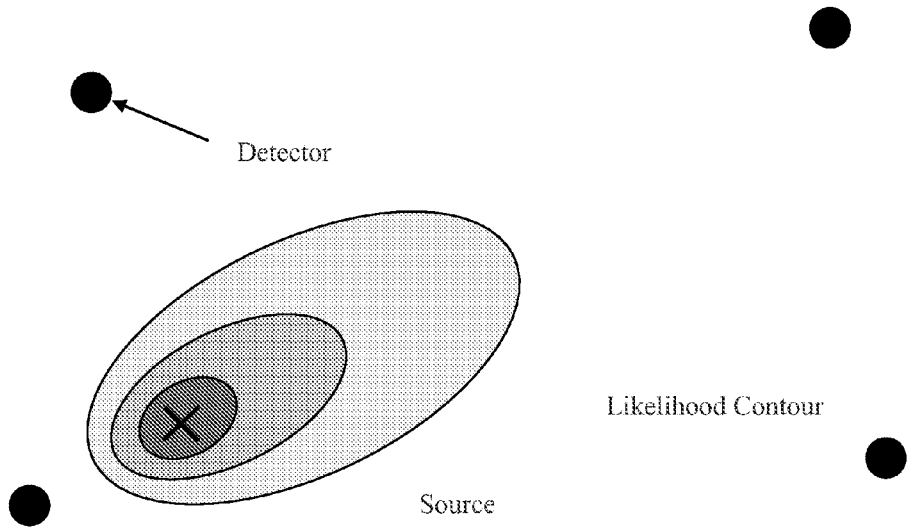
FIG. 1 is a schematic showing a series of probability contours in two-dimensional space representing the location of a radioactive source observed by a non-occluded detector array.

According to an embodiment, a directional radiation detector obtains source directionality by either placing an absorbing medium between detector elements, which are arranged in an array, or by positioning the individual detector elements such that the view of the source by each detector is partially occluded. The degree of occlusion is a function of the orientation of the array with respect to the source. Processing of count rate data associated with the detector unit relates relative count rates in individual detector elements with the direction of the incoming radiation. Processing of count rate data may be accomplished in near real-time to achieve efficient detection and tracking of a radiation source within an environment. The relationship between count rate and array orientation needed to infer source direction may be established a priori, for example, in the laboratory or through simulations.

Various embodiments of the present systems and methods incorporate an occluded detector array that comprises a matrix of tightly packed individual detectors. Such a tight-pitched directional array arranges a plurality of radiation sensors that are closely spaced together, for example, within one foot of each other when configured in a substantially square orientation. In light of the detector orientation, each detector in the tight-pitched directional array obtains a slightly different radiation signal. Processing may be performed on the detector signals to assign an uncertainty or probability that the source is within the detector's field-of-view. Taken collectively, count rates from the matrix of detectors exhibit unique angular dependence, thereby providing the basis for determining directionality of the radiation source relative to the directional detector. Thus a directional detector array can include a plurality of tightly-packed individual detector elements and the principle of occlusion may be applied to infer the direction of a radioactive source. Various embodiments may use gamma ray or neutron detectors.

Signal processing of count data for a single standalone directional detector provide a precise statement of angle to the source, including an estimate for position angle uncertainty. Extending the signal processing capability within an integrated system comprising multiple units provides a more accurate position estimate than is achievable using the same number of standalone units operating independent of each other. By operating in an integrated fashion, count data from multiple detector units provide an estimate for the coordinates, i.e., location within an environment, of a radiation source detected in the surveilled space.

A number of attributes may be taken into consideration in arriving at the estimate for source location. These include representation of the positions of the directional detector units with respect to each other and the constraints this places on physically possible source location; the dependence of individual detector element count rates on source position and array orientation and the constraints this places on physically possible source locations; the measurable variation in background radiation with detector position and its subsequent removal from the total count rate providing a better estimate for the source activity; and the known uncertainties in measurements. The predicted spatial region that contains the radiation source may be defined with given confidence upon propagating these various uncertainties. Although the approach and signal processing has been described for a tight-pitched occluded array detector, the approach is generally applicable to other detector types. These include the Compton-scattering camera, the coded-aperture camera, and positron emission backscatter imaging.

The primary principle for determining the direction to a gamma-ray source is based on self-occlusion of the detector elements. To occlude is to prevent the passage of something. In terms of the present systems and methods, occlusion is the attenuation of gamma-rays by various detector elements. A model for the emission of gamma rays from a radioactive source is derived from a few basic assumptions. One assumption is that the probability of a single emission per unit time is $\lambda$. This differs from the traditional use of $\lambda$ to denote activity. It is assumed that the number of gamma rays, n, emitted in the time interval $\Delta t$ by a source is a random variable characterized by a Poisson distribution:

$$p(\lambda \Delta t \mid n) = \frac{(\lambda \Delta t)^n}{n!} e^{-\lambda \Delta t}. \quad (1)$$

The parameter $\lambda$ exclusive to the radioactive decay process and has no dependence on detector location or detection efficiency. It is treated as a free parameter whose value depends on the type of source and whose value is to be estimated from measurements.

The counts registered by a detector near the source are a subset of all the emissions. The detector view is a fraction of the total solid angle of the source, and only a fraction of the gamma rays that enter the detector actually register as events. That is, the detector has an efficiency less than unity. Thus, for a given detector in a given position relative to a source, only a fraction $\eta$ of the total emissions from the source register as events in the detector. The quantity $\eta$ is the absolute efficiency. The probability of the detector registering an emission per unit time is then $\eta \lambda$. Then the probability of an observed count rate n from equation (1) is $$p(\eta \lambda \Delta t \mid n) = \frac{(\eta \lambda \Delta t)^n}{n!} e^{-\eta \lambda \Delta t}. \quad (2)$$

When the average number of counts, $\eta \lambda \Delta t$, is large, as it is the case here, the Poisson distribution is well approximated by the Gaussian distribution presented below as Equation (3). Where the average is greater than 20, Equation (3) is a good approximation to Equation (2). Thus, the count window interval $\Delta t$ needs to be large enough that on average at least 20 counts register.

$$p(\eta \lambda \Delta t \mid n) = \frac{1}{(2\pi \eta \lambda \Delta t)^{1/2}} e^{-\frac{(n - \eta \lambda \Delta t)^2}{2 \eta \lambda \Delta t}}. \quad (3)$$

In the presence of background radiation the number of counts measured at a detector is the sum of the contribution from the source and from background radiation. It is assumed the background can be characterized by a Gaussian distribution. For a detector 0, the sum of the background counts and source counts, both normally distributed random variables, is a normal random variable with probability density function given below, where subscripts s and b denote source and background, respectively.

$$p_0(\eta_0 \lambda_{s-0} \Delta t, \eta_0 \lambda_{b-0} \Delta t \mid n_0) = \quad (4)$$

$$\frac{1}{(2\pi(\eta_0 \lambda_{s-0} \Delta t + \eta_0 \lambda_{b-0} \Delta t))^{1/2}} e^{-\frac{(n_0 - (\eta_0 \lambda_{s-0} \Delta t + \eta_0 \lambda_{b-0} \Delta t))^2}{2(\eta_0 \lambda_{s-0} \Delta t + \eta_0 \lambda_{b-0} \Delta t)}}$$

The combined count rates observed at multiple widely-distributed detectors, a distributed detector array, can provide more precise information about a source when the count rates are viewed as part of an integrated network. Fundamentally, the combined scintillator volume is greater than a single detector yielding an improved signal-to-noise ratio. An extension of the single-detector probabilistic function to multiple detectors can utilize the correlation among count rates across detectors. However, the background radiation will vary from detector to detector as will detector efficiency.

A radioactive source that is concentrated at a point can be located in space through a combination of triangulation and the knowledge that the count rate falls off (ideally) as one over the distance squared. However, because the count rate is a probability density function, the exact location will be subject to uncertainty. Both the distance law and emission probability may be used to derive the likelihood that the source is located at a particular position. Consider a detector i with efficiency $\eta_i$, at a distance $r_i$ from the same source. The probability distribution function of the counts registered by the detector is:

$$p_i(\eta_0 \lambda_{s-0} \Delta t, \eta_0 \lambda_{b-i} \Delta t, r_0/r_i, \eta_i/\eta_0 \mid n_i) = \quad (5)$$

$$\frac{\exp - \left\{ \frac{\left(n_i - \left(\frac{\eta_i}{\eta_0}\right)\left(\left(\frac{r_0}{r_i}\right)^2 \eta_0 \lambda_{s-0} \Delta t + \eta_0 \lambda_{b-i} \Delta t\right)\right)^2}{2\left(\frac{\eta_i}{\eta_0}\right)\left(\left(\frac{r_0}{r_i}\right)^2 \eta_0 \lambda_{s-0} \Delta t + \eta_0 \lambda_{b-i} \Delta t\right)} \right\}}{\left(2\pi\left(\frac{\eta_i}{\eta_0}\right)\left(\left(\frac{r_0}{r_i}\right)^2 \eta_0 \lambda_{s-0} \Delta t + \eta_0 \lambda_{b-i} \Delta t\right)\right)^{1/2}}$$

Equation (5) indicates that the probability of a single count being observed in unit time is proportional to the detector efficiency and inversely proportional to the square of the distance to the source. The probability that two detectors will see a particular set of counts can be derived from Equation (5). In particular, the subscripts i and j denote two detectors. Because a count seen at detector i is independent of a count at detector j (assume each count is the consequence of two separate disintegrations that are independent of each other; registering of coincidence events is assumed negligible due to a very small detector solid angle) the joint probability is the product of the individual detector probabilities $$p_i(\eta_0\lambda_{s-0}\Delta t, \eta_0\lambda_{b-j}\Delta t, r_0/r_i, \eta_i/\eta_0|n_i) p_j(\eta_0\lambda_{s-0}\Delta t, \eta_0\lambda_{b-j}\Delta t, r_0/r_j, \eta_j/\eta_0|n_j) \quad (6)$$

where each of these two terms is given by Equation (5). Similarly, for m detectors, the probability of obtaining counts $n_0, n_1, \ldots, n_{m-1}$ in detectors 0 through m−1, respectively, is $$p(\eta_0 \lambda_{s-0} \Delta t, \eta_0 \lambda_{b-0} \Delta t, r_0/r_1, \eta_1/\eta_0, \ldots, \quad (7)$$
$$\eta_0 \lambda_{b-m-1} \Delta t, r_0/r_{m-1}, \eta_{m-1}/\eta_0 \mid n_0, n_1, \ldots, n_{m-1}) =$$
$$\prod_{i=0}^{m-1} p_i(\eta_0 \lambda_{s-0} \Delta t, \eta_0 \lambda_{b-i} \Delta t, r_0/r_i, \eta_i/\eta_0 \mid n_i)$$

where the left-hand side represents the joint probability and the right-hand side is the product of the individual detector probabilities, each given by Equation (5).

Equation (7), plotted as contours of constant value over (x,y) space, depicted in FIG. 1 provides a picture of how well the source can be located in space. For example, closely spaced contour lines in the plot indicate the likelihood that the source being at a particular point falls off rapidly as one moves away from the most likely point.

In a preferred embodiment a plurality of detectors are arranged in tight-pitched array. In a particular embodiment, an array of four detector elements are arranged in a substantially square configuration, however, other configurations may be implemented. A set of detector elements arranged in a tight-pitched array is a special case of the general configuration of detectors treated above. The same model is therefore applicable for describing the tight-pitched array. However, in view of the properties of the tight-pitched array, a reduced form of the model is obtainable; and the shape of the probability density function is altered. The shape of the tight-pitched array reflects the fact that the probability density function will have its maximum value along the radius pointing out from the center of the detector array in the direction of the source.

Figure 2:
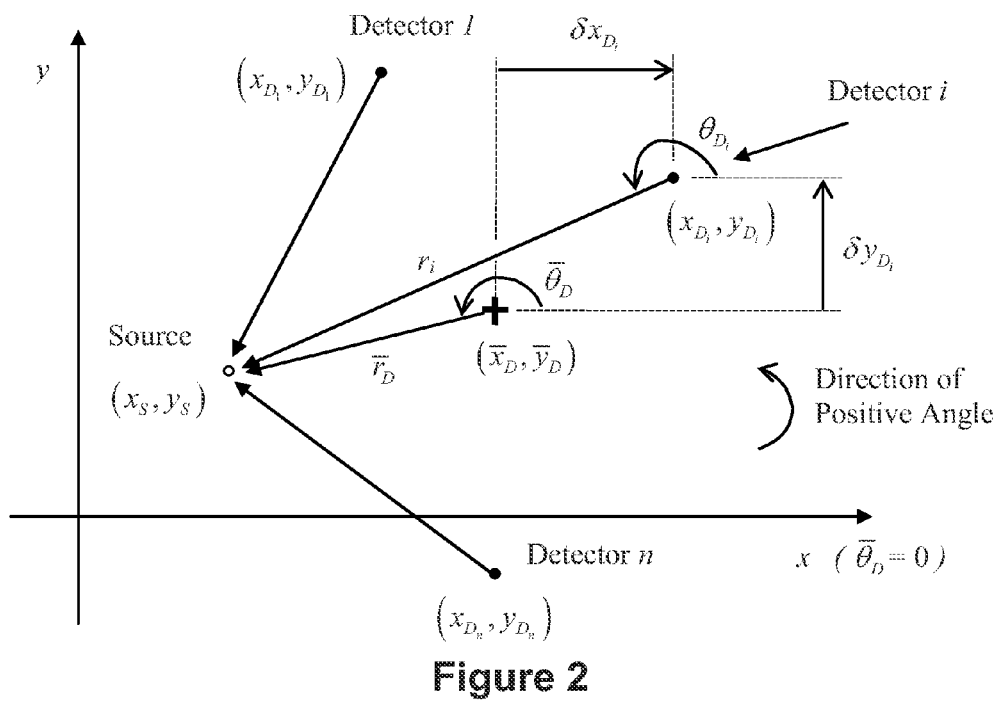
FIG. 2 is a schematic representation of various geometric variables for a close-packed detector array according to an embodiment of the present invention.

To derive the probability density function for the case of a detector element that is a member of a tight-pitched array, Equation (5), which gives the probability of finding the source at a distance $r_i$ from an isotropic detector i with counts $n_i$, is re-written. First, the geometric variables unique to the detector array are defined. FIG. 2 shows the relationship among the various geometric variables used to describe the detector array. The geometric center of the array is:

$$\bar{x}_D = \frac{1}{n}\sum_n x_{D_i}, \quad \bar{y}_D = \frac{1}{n}\sum_n y_{D_i} \quad (8)$$

where $(x_{D_i}, y_{D_i})$ are the coordinates of the center of detector $D_i$, i=0, ... m. The position of the center of each detector in terms of the array geometric center is defined as:

$$x_{D_i} = \bar{x}_D + \delta x_{D_i}, y_{D_i} = \bar{y}_D + \delta y_{D_i}. \quad (9)$$

The distance squared from the detector to the source is:

$$r_i^2 = (x_S - x_{D_i})^2 + (y_S - y_{D_i})^2 \quad (10)$$

where the coordinates of the source are $(x_S, y_S)$. The angle formed between the positive x axis and the ray from the detector to the source is:

$$\theta_i = \tan^{-1}\frac{y_S - y_{D_i}}{x_S - x_{D_i}}. \quad (11)$$

The detector array response tends toward a limiting behavior at relatively large source distances as a consequence of the tight detector element packing. From FIG. 2 the expression is obtained $$\frac{(x_S - (\bar{x}_D + \delta x_{D_i}))^2}{r_i^2} + \frac{(y_S - (\bar{y}_D + \delta y_{D_i}))^2}{r_i^2} = 1 \quad (12)$$

Additionally, the limit as the inter-detector element spacing becomes small compared to the source to array distance:

$$\lim_{\frac{\delta x_{D_i}}{r_i^2}, \frac{\delta y_{D_i}}{r_i^2} \to 0} \frac{(x_S - \bar{x}_D)^2}{r_i^2} + \frac{(y_S - \bar{y}_D)^2}{r_i^2} = 1 \quad (13)$$

Thus, a single distance substitutes for the individual source to detector-element distances, $$r_i^2 = \bar{r}_D^2 = (x_S - \bar{x}_D)^2 + (y_S - \bar{y}_D)^2 \quad (14)$$

Also, the individual detector element angles tend toward a limit $$\theta_i = \bar{\theta}_D = \lim_{\frac{\delta x_{D_i}}{r_i^2}, \frac{\delta y_{D_i}}{r_i^2} \to 0} \tan^{-1} \frac{y_S - (\bar{y}_D + \delta y_{D_i})}{x_S - (\bar{x}_D + \delta x_{D_i})} \quad (15)$$

so that $$\bar{\theta}_D = \tan^{-1} \frac{y_S - \bar{y}_D}{x_S - \bar{x}_D} \quad (16)$$

In practice, the above expression for the angle to the source proves impractical because an exception is needed when the denominator becomes small. In its place, the expression below may be used.

$$\bar{\theta}_D = \sin^{-1} \frac{y_S - \bar{y}_D}{\bar{r}_D} \quad (17)$$

Figure 3:
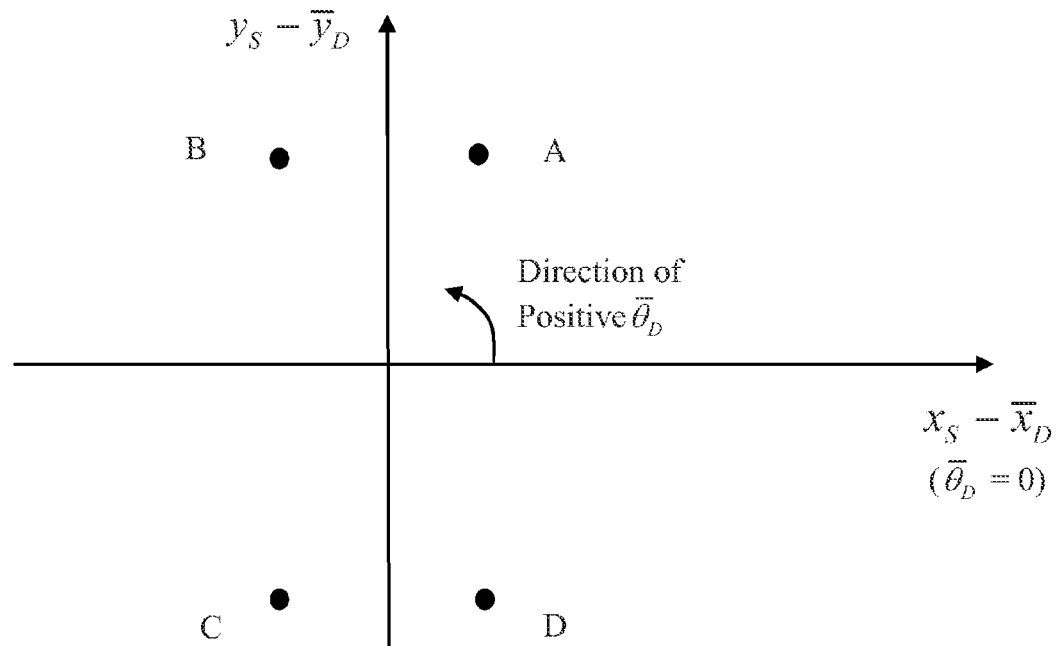
FIG. 3 is a schematic depicting a configuration for resolving source location to a quadrant using data acquired by a close-packed detector array.

The presence of the inverse sine function in equation (17), however, requires special attention. There can be two angles for a given value of the function. A logic test may be used to select the appropriate angle. The selection is based on the signs of $x_S - \bar{x}_D$ and of $y_S - \bar{y}_D$. The approach is to locate the source to within one of four quadrants. Within that quadrant there is a unique relationship between the inverse sine and the angle $\bar{\theta}_D$. FIG. 3 depicts the above described problem. In the depicted configuration, the detector array is assumed to be centered at the origin. Four possible source locations are marked with the letters A, B, C, and D. The absolute value of $x_S - \bar{x}_D$ and of $y_S - \bar{y}_D$ are the same for all of these points. As seen in FIG. 3, there are four cases with respect to the signs of $x_S - \bar{x}_D$ and of $y_S - \bar{y}_D$. The angle $\bar{\theta}_D$ for each of these points is given below in terms of $$\bar{\theta}_{D-ABS} = \sin^{-1} \frac{|y_S - \bar{y}_D|}{\bar{r}_D}. \quad (18)$$

For the four points:
A: $x_S - \bar{x}_D > 0$ and $y_S - \bar{y}_D > 0 \Rightarrow 0 < \bar{\theta}_D < \pi/2 \Rightarrow \bar{\theta}_D = \bar{\theta}_{D-ABS}$
B: $x_S - \bar{x}_D < 0$ and $y_S - \bar{y}_D > 0 \Rightarrow \pi/2 < \bar{\theta}_D < \pi \Rightarrow \bar{\theta}_D = \bar{\theta}_{D-ABS} + \pi$
C: $x_S - \bar{x}_D < 0$ and $y_S - \bar{y}_D < 0 \Rightarrow \pi < \bar{\theta}_D < 3\pi/2 \Rightarrow \bar{\theta}_D = \bar{\theta}_{D-ABS} + \pi$
D: $x_S - \bar{x}_D > 0$ and $y_S - \bar{y}_D < 0 \Rightarrow -\pi/2 < \bar{\theta}_D < 0 \Rightarrow \bar{\theta}_D = \bar{\theta}_{D-ABS}$ Equation (5) is altered for the tight-pitched array in light of the above results. The expressions below are obtained:

$$\eta_i = \eta_i(\theta_i) = \eta_i(\bar{\theta}_D) \quad (19)$$

$$\frac{r_0}{r_i} = \frac{\bar{r}_D}{\bar{r}_D} = 1 \quad (20)$$

Accordingly, the expression $$n_i - \frac{\eta_i}{\eta_0} \left( \left( \frac{r_0}{r_i} \right)^2 \eta_0 \lambda_{s-0} \Delta t + \eta_0 \lambda_{b-i} \Delta t \right)$$

in Equation (5) becomes $$n_i - \frac{\eta_i(\bar{\theta}_D)}{\eta_0(\bar{\theta}_D)} (\eta_0(\bar{\theta}_D) \lambda_{s-0} \Delta t + \eta_0(\bar{\theta}_D) \lambda_{b-i} \Delta t). \quad (21)$$

Thus, for detector element i in the detector array the probability distribution function of the counts registered by the detector element is:

$$p_i(\eta_0(\bar{\theta}_D)\lambda_{s-0}\Delta t, \eta_0 \lambda_{b-i} \Delta t, \eta_i(\bar{\theta}_D)/\eta_0(\bar{\theta}_D), | n_i) = \quad (22)$$

$$\frac{e^{-\frac{\left(n_i - \frac{\eta_i(\bar{\theta}_D)}{\eta_0(\bar{\theta}_D)}(\eta_0(\bar{\theta}_D)\lambda_{s-0}\Delta t + \eta_0(\bar{\theta}_D)\lambda_{b-i}\Delta t)\right)^2}{2\frac{\eta_i(\bar{\theta}_D)}{\eta_0(\bar{\theta}_D)}(\eta_0(\bar{\theta}_D)\lambda_{s-0}\Delta t + \eta_0(\bar{\theta}_D)\lambda_{b-i}\Delta t)}}}{\left(2\pi \frac{\eta_i(\bar{\theta}_D)}{\eta_0(\bar{\theta}_D)}(\eta_0(\bar{\theta}_D)\lambda_{s-0}\Delta t + \eta_0(\bar{\theta}_D)\lambda_{b-i}\Delta t)\right)^{1/2}}.$$

The integrated response of the detector array may be obtained from the response of individual detector elements in the array. In an embodiment, where there are m detector elements in the detector array and it is assumed that coincidence events are infrequent enough that they can be neglected, then the probability of obtaining counts $n_0$, $n_1, \ldots, n_{m-1}$ in elements 0 through m−1, respectively, is $$p\left(\eta_0(\bar{\theta}_D)\lambda_{s-0}\Delta t, \eta_0(\bar{\theta}_D)\lambda_{b-0}\Delta t, \eta_1(\bar{\theta}_D)\big/\eta_0(\vec{\theta}_D), \ldots, \right. \quad (23)$$

$$\left. \eta_0 \lambda_{b-m-1}\Delta t, \eta_{m-1}(\bar{\theta}_D)/\eta_0(\bar{\theta}_D) \mid n_0, n_1, \ldots, n_{m-1}\right) =$$

$$\prod_{i=0}^{m-1} p_i(\eta_0(\bar{\theta}_D)\lambda_{s-0}\Delta t, \eta_0(\bar{\theta}_D)\lambda_{b-i}\Delta t, \eta_i(\bar{\theta}_D)/\eta_0(\bar{\theta}_D) \mid n_i)$$

The left-hand side of Equation (23) represents the joint probability and the right-hand side is the product of the individual detector probabilities. It should be noted that the assumption of coincidence events are infrequent may not hold where the detectors are in close proximity or if their physical size accentuates detection of coincidence events.

In the context of an occluded detector array, a detector element in the detector array may be occluded by one or more detector element neighbors. The degree of occlusion will depend on the location of the source relative to the detector unit and the unit's orientation. The dependence of count rate on these two effects is captured by the term $\eta_i(\bar{\theta}_D)/\eta_0(\bar{\theta}_D)$. This term can be conveniently measured in the laboratory or other setting.

Figure 4:
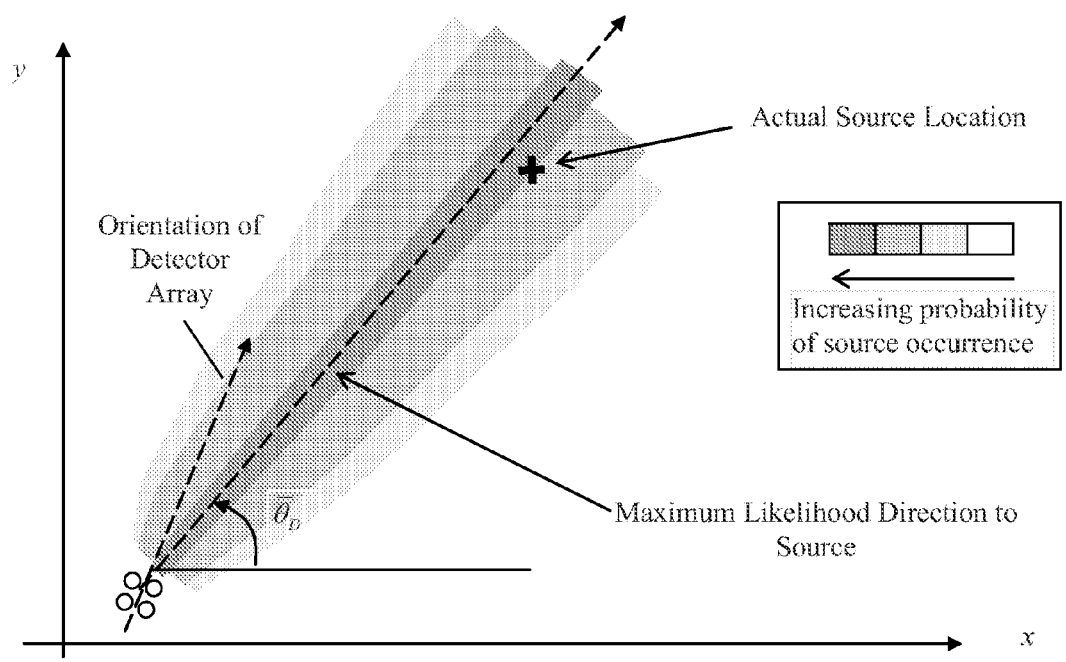
FIG. 4 is a schematic showing source-probability contours for a close-packed detector array according to an embodiment of the present invention depicting direction information for the source.

An estimate for the source position is obtained in a manner analogous to that for the non-occluded array. The likelihood that for a given value of $\bar{\theta}_D$ that the model reproduces the measured counts is given by Equation (23). For a grid that overlays an environment, e.g., a venue, equation (23) defines a three-dimensional surface that is the probability of finding the source at any position within the environment. This surface will have a maximum along the radius that extends from the center of the detector unit out through the source. That is the probability will be maximized for the value of $\bar{\theta}_D$ that corresponds to the direction to the source. The main features of such a surface displayed as probability contours are shown in FIG. 4. Although directionality is described for a two dimensional system, it can be extended to three dimensions by including an azimuthal angle, $\Psi$.

The above development neglects the dependence of average path length through a detector on the distance of the source from the detector element. That is, as the source distance from the detector element is varied, the distribution of paths through the detector of the incident radiation changes. This is a consequence of the detector element having a finite size. Strictly then, absolute detector efficiency will depend on distance. It is also noted that absolute efficiency depends on incident photon energy. Thus, in equation (23) the efficiency more properly becomes $$\eta_i(\bar{\theta}_D) \to \eta_i(\bar{\theta}_D, r, E_\gamma), \quad (24)$$

where r is the source-detector distance and $E_\gamma$ is the photon energy. The dependence on r may be used to estimate source distance from the detector array. The accuracy of the estimate will depend on how strong a function this is.

As demonstrated above, a single detector array can provide the direction to the source but as a practical matter the signal cannot reliably provide the distance to the source and hence not the source position within the venue. Two or more such detector units, however, can provide source position through the intersection of their respective directional radii. For multiple and widely-separated detector arrays a probability surface for the source position overlays the venue grid. Thus, for an element i in array j denoted by $A_j$, Equation (21) becomes $$n_{A_j,i} - \frac{\eta_{A_j,i}(\bar{\theta}_{A_j})}{\eta_{A_j,0}(\bar{\theta}_{A_j})}\left(\eta_{A_j,0}(\bar{\theta}_{A_j})\lambda_{s-0}\Delta t + \eta_{A_j,0}(\bar{\theta}_{A_j})\lambda_{b-i}\Delta t\right) \quad (25)$$

where $\bar{\theta}_{A_j}$ is the analog of $\bar{\theta}_D$ in FIG. 2.

In a particular embodiment, where all detector units are physically identical, that is, unit 4 is substantially identical to unit $A_0$, then the dependence of efficiency with angle is the same for all units so that Equation (25) becomes $$n_{A_j,i} - \frac{\eta_{A_0,i}(\bar{\theta}_{A_j})}{\eta_{A_0,0}(\bar{\theta}_{A_j})}\left(\eta_{A_0,0}(\bar{\theta}_{A_j})\lambda_{s-0}\Delta t + \eta_{A_0,0}(\bar{\theta}_{A_j})\lambda_{b-i}\Delta t\right) \quad (26)$$

so that $$p_i(\eta_{A_0,0}(\bar{\theta}_{A_j})\lambda_{s-0}\Delta t, \eta_{A_0,0}(\bar{\theta}_{A_j})\lambda_{b-i}\Delta t, \eta_{A_0,i}(\bar{\theta}_{A_j})/\eta_{A_0,0}(\bar{\theta}_{A_j}) \mid n_i) = \quad (27)$$

$$\frac{e^{-\frac{\left(n_{A_j,i} - \frac{\eta_{A_0,i}(\bar{\theta}_{A_j})}{\eta_{A_0,0}(\bar{\theta}_{A_j})}(\eta_{A_0,0(\bar{\theta}_{A_j})}\lambda_{s-0}\Delta t + \eta_{A_0,0}(\bar{\theta}_{A_j})\lambda_{b-i}\Delta t)\right)^2}{2\frac{\eta_{A_0,i}(\bar{\theta}_{A_j})}{\eta_{A_0,0}(\bar{\theta}_{A_j})}(\eta_{A_0,0}(\bar{\theta}_{A_j})\lambda_{s-0}\Delta t + \eta_{A_0,0}(\bar{\theta}_{A_j})\lambda_{b-i}\Delta t)}}}{\left(2\pi\frac{\eta_{A_0,i}(\bar{\theta}_{A_j})}{\eta_{A_0,0}(\bar{\theta}_{A_j})}(\eta_{A_0,0}(\bar{\theta}_{A_j})\lambda_{s-0}\Delta t + \eta_{A_0,0}(\bar{\theta}_{A_j})\lambda_{b-i}\Delta t)\right)^{1/2}}$$

Accordingly, for r such arrays the probability surface is given by $$p = \prod_{j=0}^{r-1}\prod_{i=0}^{m-1} p_i(\eta_{A_0,0}(\bar{\theta}_{A_j})\lambda_{s-0}\Delta t, \eta_{A_0,0}(\bar{\theta}_{A_j})\lambda_{b-i}\Delta t, \eta_{A_0,i}(\bar{\theta}_{A_j})/\eta_{A_0,0}(\bar{\theta}_{A_j}) \mid n_i) \quad (28)$$

Figure 5:
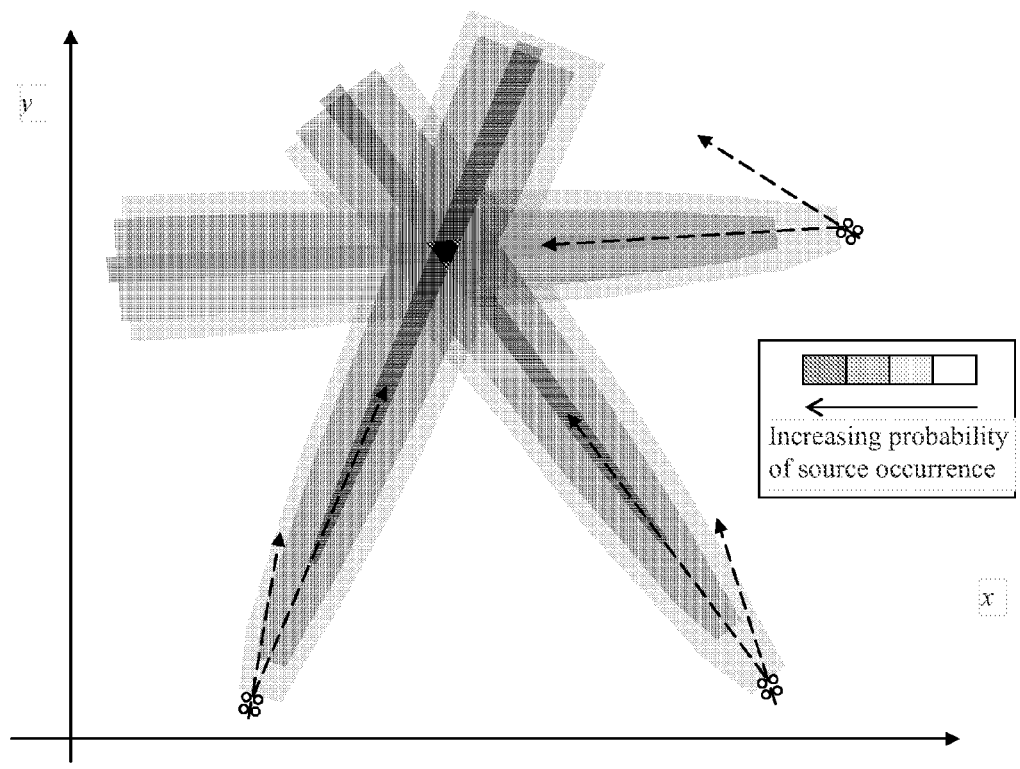
FIG. 5 is a schematic showing source-probability contours presenting position information for the source obtained from the plurality of the close-packed detector arrays of FIG. 4.

The main features of the surface described by equation (28) are depicted as probability contours in FIG. 5. Equations (7) and (28) may be generalized in the case of a detector system comprising both individual isotropic detectors (i.e. a non-occluded array) and occluded array detectors.

The generalized approach to obtaining the probability of source position described above may be applied to a particular array operating in a specific venue. This may be accomplished by determining the actual dependencies of the functions appearing in Equation (23). Specifically, for a particular embodiment of an array it is necessary to provide: (1) the detector position and orientation in the venue coordinate system; (2) the efficiency ratio dependence on angle and energy derived from experiments or by computation; and (3) the background radiation field in the venue.

Figure 6:
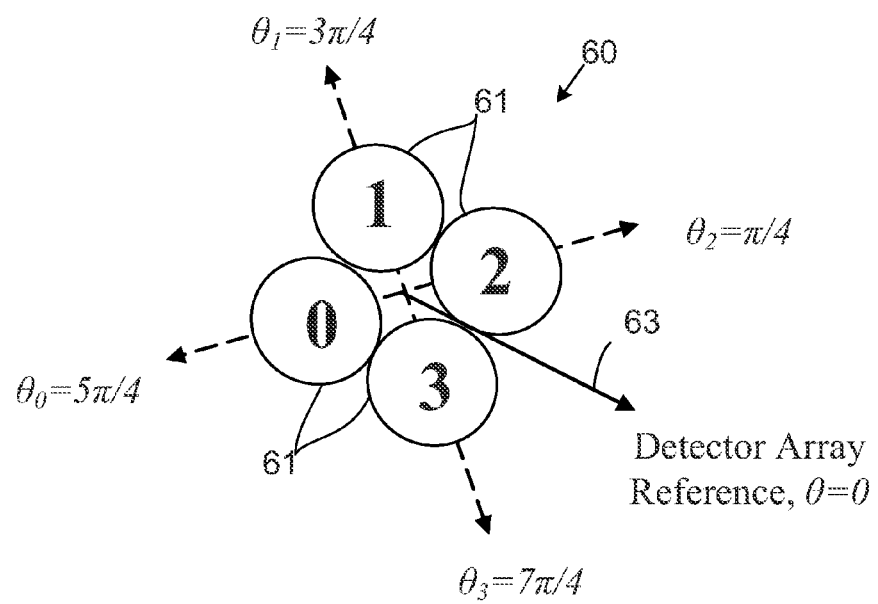
FIG. 6 is a schematic depicting an internal coordinate system of the close-packed detector array of FIG. 4 having four detector elements.
Figure 7:
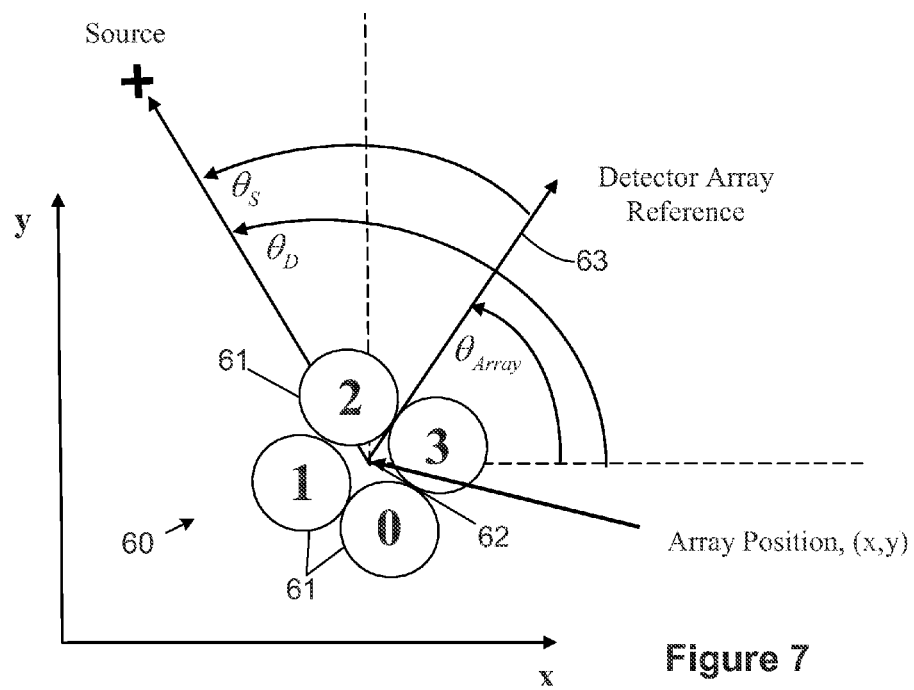
FIG. 7 is a schematic depicting the internal coordinate system of the close-packed detector array of FIG. 6 in a venue coordinate system specifying a position and orientation of the detector array in the venue coordinate system.

Measurements were obtained for an occluded-detector array 60 depicted in FIG. 6 to determine the functional dependencies in Equation (23) described above. The detector array was comprised of four 3 inch×3 inch sodium-iodide thalium-doped detectors 61 arranged with their centers on a square and their edges touching. A reference direction 63, defined with respect to the array detector elements 61, specifies the orientation of the occluded-detector array 60 in the venue coordinate system. An internal angle θ is defined and referenced to this direction as shown in FIG. 6. The occluded-detector array 60 is referenced to the venue coordinate system through the position (x,y) and the angle $\theta_{Array}$ as shown in FIG. 7. FIG. 7 further depicts two other angles. The angle to the source with respect to the array's reference direction is $\theta_S$; and the angle to the source with respect to the line parallel to the x axis that passes through the array center 62 is $\theta_D$. These three angles are related through the expression $\theta_D = \theta_{Array} + \theta_S$ (29).

Figure 8:
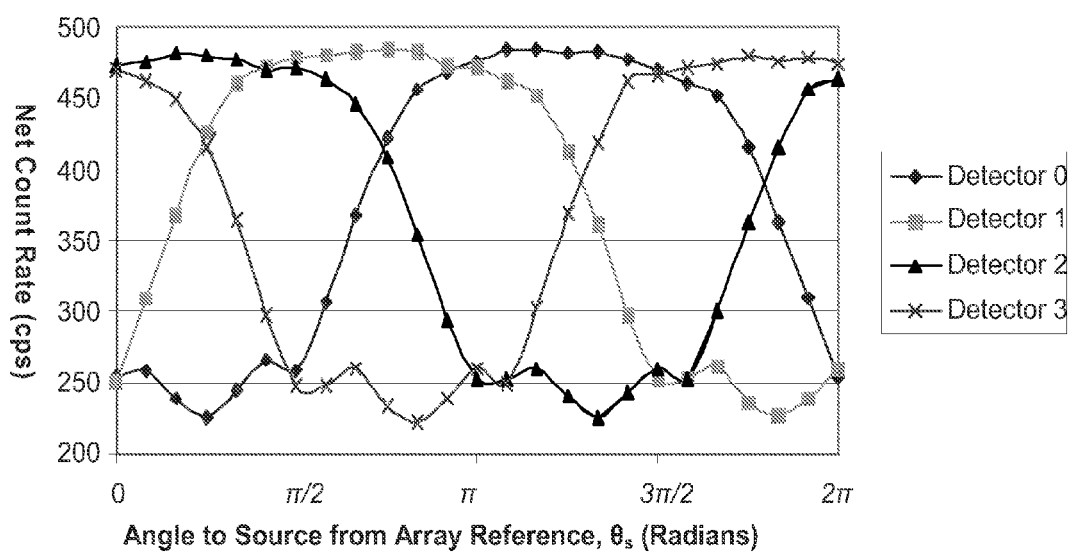
FIG. 8 is a plot of source counts for a Co-60 source observed by each of the four detector elements of the close-packed detector array of FIG. 4.

Data were taken to determine the dependence of the efficiency ratio in equation (23) on source energy, E, and angle to the source, $\theta_S$. Three different isotopes were used—Co-60, Cs-137, and Ba-133. Each of these isotopes was placed at a fixed position 20 feet from the occluded-detector array 60 and the occluded-detector array 60 was rotated in 15 degree increments about the z-axis a full 360 degrees. The response of each detector element 61 in counts per second for Co-60 is shown in FIG. 8 with the background radiation contribution subtracted. By virtue of a π/2 array symmetry the counts among the detector elements 61 are related through $$n_i(\theta_s - i*\pi/2) = n_0(\theta_s), i = 0, \ldots, 3. \quad (30)$$

Figure 9:
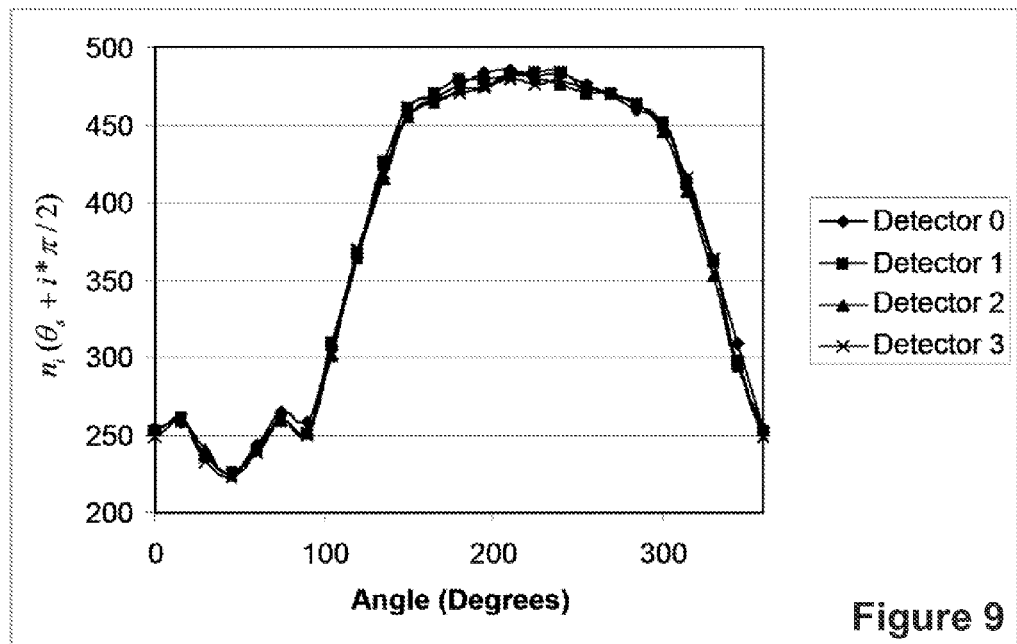
FIG. 9 is a plot showing a superimposition of the source counts of FIG. 8.

As such, the data depicted in FIG. 8 may be shifted, as shown in FIG. 9, where the data very nearly satisfy equation (30). The variation in observed counts among the detector elements 61 is less than about 1%.

The efficiency ratios in equation (25) are obtained for Co-60 from the data of FIG. 9 and for Cs-137 and Ba-133 from similar (data not shown). The relationship between the detector efficiency expressed as a function of source angle with respect to the array, $\eta_i'(\theta_s)$, and the average counts, n, $(\theta_s)$, is $$\eta_i'(\theta_s)\lambda_s \Delta t = n_i(\theta_s) \quad (31)$$

Combining equation (33) with equation (32) yields $$\frac{\eta_i'(\theta_s)}{\eta_0'(\theta_s)} = \frac{n_i(\theta_s)}{n_0(\theta_s)} = \frac{n_i(\theta_s + i*\pi/2)}{n_0(\theta_s)}, i = 0, \ldots, 3 \quad (32)$$

However, $\eta_i'(\theta_s)$ is related to $\eta_i(\overline{\theta}_D)$ through the expression $$\eta_i'(\theta_s) = \eta_i(\theta_S + \theta_{Array}) = \eta_i(\overline{\theta}_D). \quad (33)$$

Thus, from equations (32) and (33) the following expression is obtained:

$$\frac{\eta_i(\overline{\theta}_D)}{\eta_0(\overline{\theta}_D)} = \frac{\eta_i'(\theta_s)}{\eta_0'(\theta_s)} = \frac{n_0(\theta_s + i*\pi/2)}{n_0(\theta_s)}, i = 0, \ldots, 3. \quad (34)$$

That is, the efficiency ratio in equation (25) can be obtained from the data that is depicted in FIG. 9.

Figure 10:
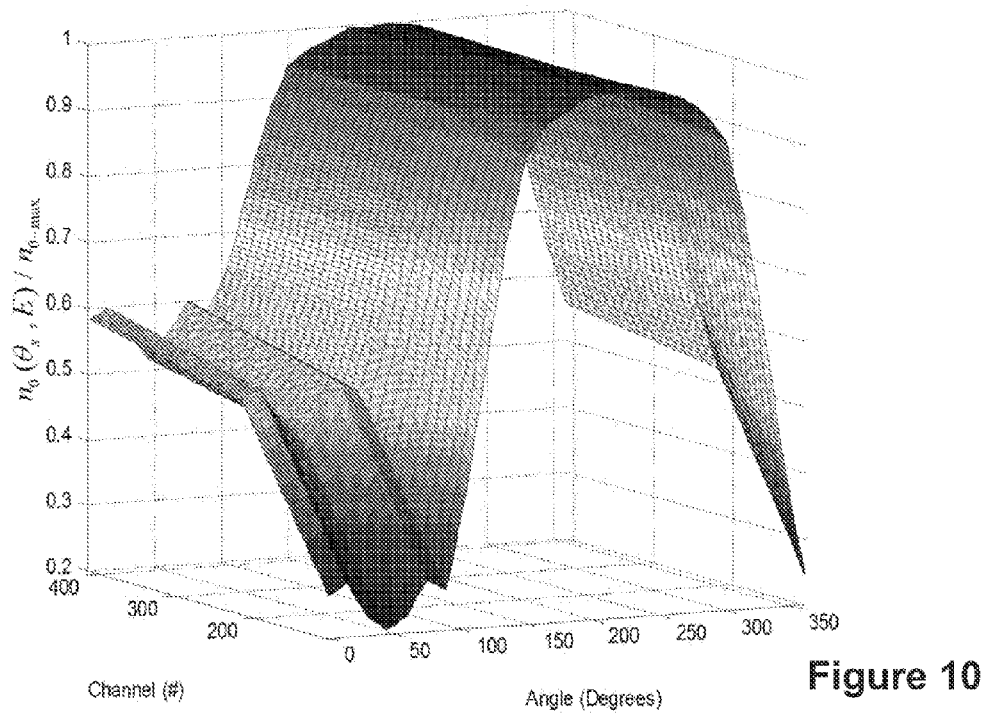
FIG. 10 is a plot showing the normalized detector efficiency of an occluded-detector array as a function of angle and energy.

The left-hand side of the above equation is approximated from the data as follows. For each of the isotopes, the counts on the right side are normalized to unity after averaging over each of the counts of the four detector elements 61. This normalized data for the three isotopes was fit to a two-dimensional function in $\theta_S$ and E and is shown in FIG. 10. The ordinate is $n_0(\theta_s)/n_{0\text{-}max}$ where $n_{0\text{-}max}$ is the maximum value of $n_0$ $(\theta_s)$. The efficiency ratio can be obtained from this fit through $$\frac{\eta_i(\overline{\theta}_D, E)}{\eta_0(\overline{\theta}_D, E)} = \frac{n_0(\theta_s + i*\pi/2, E)/n_{0\text{-}max}}{n_0(\theta_s, E)/n_{0\text{-}max}}, i = 0, \ldots, 3. \quad (35)$$

Figure 11:
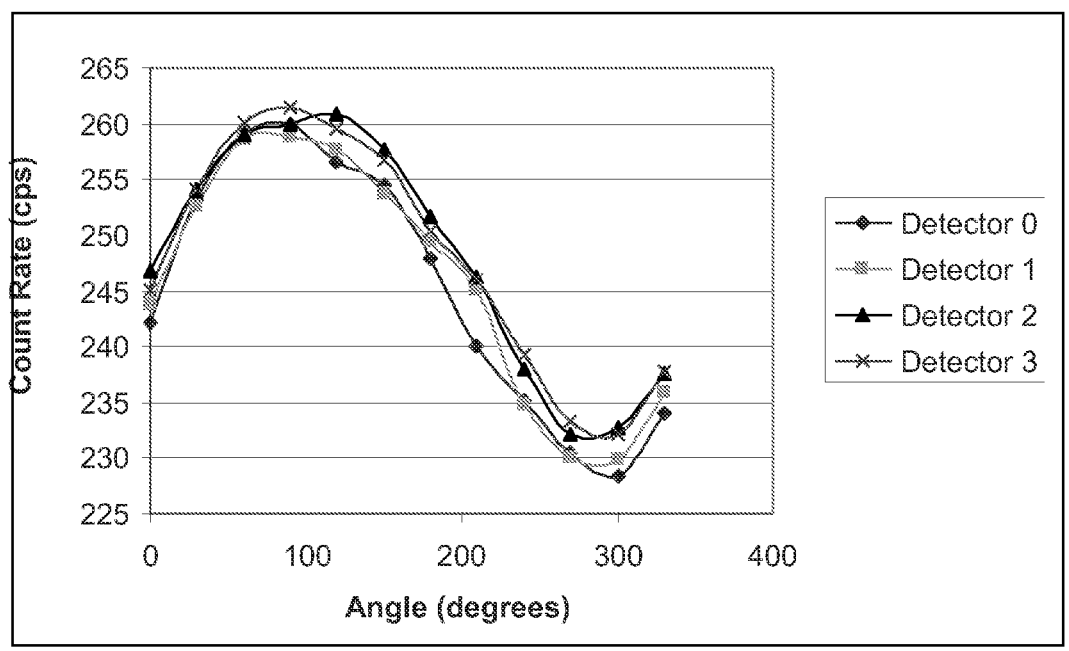
FIG. 11 is a plot showing a superimposition of background radiation counts for each of the detectors of FIG. 4.

In the present embodiment, the background radiation field in the laboratory was known to be non-isotropic as a result of spatially-local contamination. Background measured by each of the detector elements 61 is shown in FIG. 11 for the occluded-detector array 60, again rotated in 15 degree increments a full 360 degrees. The data in FIG. 11 for each of the detector elements 61 have been shifted by the detector's angle relative to the reference direction. As seen in FIG. 11, the background radiation varies with position as much as 12 percent. The variation reflects the directional nature of the field and the occlusion of each detector 61 by neighboring detectors.

It is implied that the energy of the source must be known to obtain a response from the occluded-detector array 60. The dependence may be obtained by, for example, determining an integrated signal-to-noise ratio (SNR) curve for each of the detector elements 61.

$$SNR = \frac{\dfrac{\sum_i T_i}{t_T} - \dfrac{\sum_i B_i}{t_B}}{\sqrt{\dfrac{\sum_i T_i}{t_T^2} + \dfrac{\sum_i B_i}{t_B^2}}} \quad (36)$$

In Equation (36), i is channel number, $\Sigma T_i$ is the sum of counts by channel up to the $i^{th}$ channel, $t_T$ is the live time of the sample window, and $\Sigma B_i$ is the sum of counts by channel of the background spectrum with count time $t_B$. The resulting integrated signal-to-noise ratio for a detector is binned into n-channel bins which serve to smooth noisy regions of the nominally one-second spectra. The first bin with the maximum value of signal-to-noise ratio is determined. The channel number of the last channel in the first bin of highest SNR is called the cutoff channel for a given detector and is used to approximate the energy of the source. The significance of this point is that the signal-to-noise ratio has peaked; the meaningful region of the spectrum has effectively ended and all counts above this point contribute only to the noise of the signal.

Preparation of the spectra takes place before the cutoff energy is computed. The spectra are normalized for live time. This normalization also accounts for incidents of significant dead time and pulse pile-up, such as when large (or exceptionally close) sources saturate the detector and cause reported count rates to be lower than actual rates of interaction in the detector in addition to generating a false high-energy bias in the spectrum. The normalized spectra are adjusted for background and noise by subtracting the average background spectrum and eliminating noisy channels in the high energy region.

In principle the likelihood of finding the source at any location in the venue is given by equation (25). However, this expression assumes that the source strength is known. This is not the case and so the source strength is estimated by the maximum likelihood method i.e. at each position the source strength is taken to be the value that maximizes the likelihood of finding the source there. The result is a probability surface that is referred to as a probability density function (PDF) map. The estimated source location is taken to be that point where this function has its maximum value over the entire grid.

To calculate the PDF map a Cartesian grid is defined for the venue. At each (x,y) grid point the value of $\overline{\theta}_D$ is obtained from a coordinate transformation and equation (23) is maximized with respect to source strength $\eta_0(\overline{\theta}_D)\lambda_{s\text{-}0}\Delta t$. For large problems the maximization procedure can introduce noticeable lag in the estimated position. However, the lag is significantly reduced if alternatively $\eta_0(\overline{\theta}_D)\lambda_{s\text{-}0}\Delta t$ is approximated by $$\eta_0(\overline{\theta}_D)\lambda_{s\text{-}0}\Delta t \approx \frac{n_0(\overline{\theta}_D)}{\eta_{max}(\overline{\theta}_D)}(n_{max} - \eta_{max}(\overline{\theta}_D)\lambda_{b\text{-}0}\Delta t) \quad (37)$$

$$= \frac{\eta_0'(\theta_S)}{\eta_{max}'(\theta_S)}(n_{max} - \eta_{max}'(\theta_S)\lambda_{b\text{-}0}\Delta t)$$

where $n_{max}$ is the measured source count rate at the detector element 61 with the highest source counts. The quantity to be estimated is $\eta_{max}'(\overline{\theta}_S)\lambda_{b\text{-}0}\Delta t$, which is taken as the source count rate at the detector with the strongest signal. The highest count rate detector is selected because it gives the best statistics among all of the detector elements 61.

Figure 12:
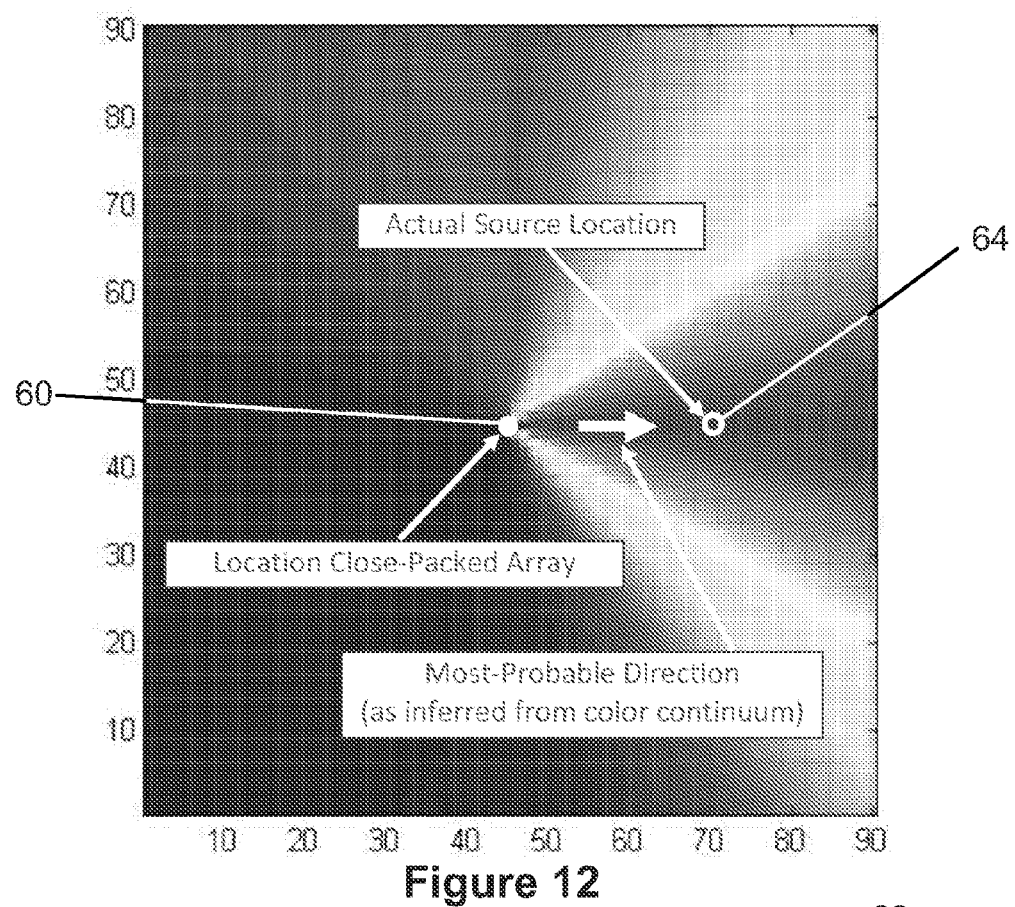
FIG. 12 is a plot showing a probability density map obtained from a single close-packed detector array in the presence of a 750 µCi Co-60 source.

The performance of the close-packed detector array 60 depicted in FIG. 6 was investigated as a standalone unit and as one of several identical units integrated into a system. FIG. 12 shows the PDF for the estimate position of a 750 µCi Co-60 source 64 located 25 feet to the right of a single close-packed detector array 60. The most probable location of the source 64, as determined by the close-packed detector array 60 is shown by the white arrow which represents the direction implied by the shading continuum of the PDF. The approach correctly identified the direction of the source 64 after processing the spectrum to determine energy and then sweeping the grid looking for the maximum likelihood position. The PDF shading contours indicate all points directly to the right of the array are equally likely to contain the source. This is expected because distance to the source was not was built into the response function of the detector array 60 per FIG. 10.

Figure 13:
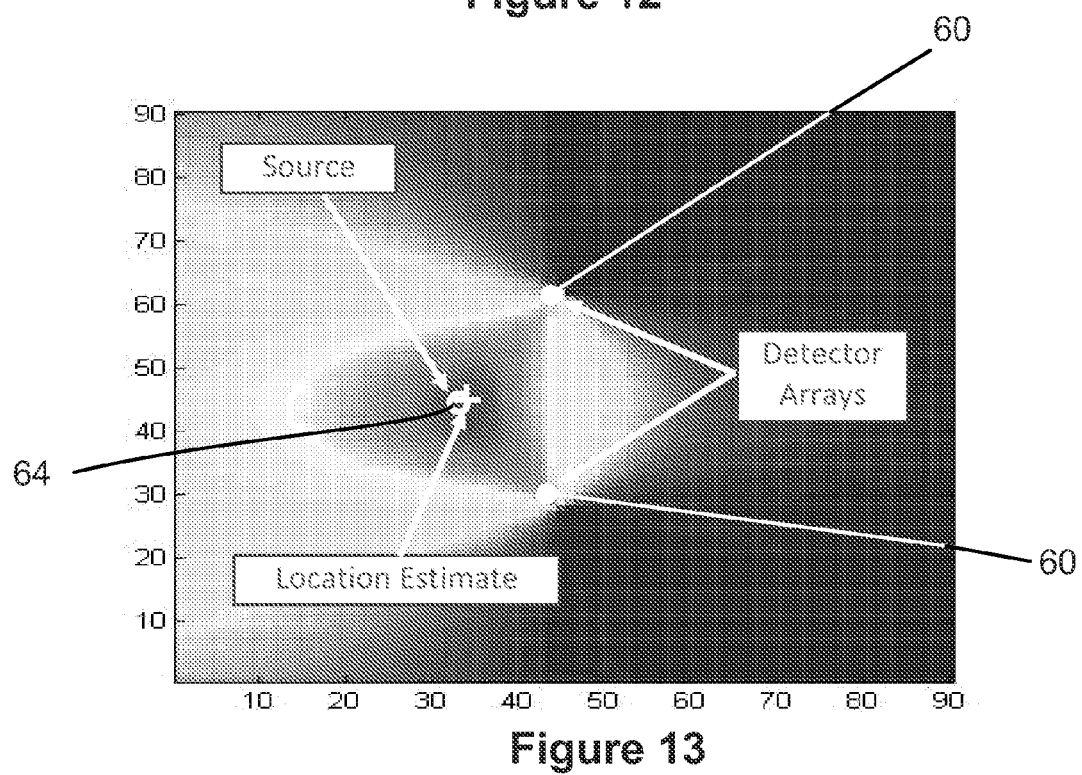
FIG. 13 is a plot showing a probability density map for two integrated close-packed detector arrays of FIG. 12 in the presence of a 750 µCi Co-60 source.

FIG. 13 shows the PDF generated for an embodiment where two close-packed detector arrays 60 are separated by about 30 feet and demonstrates the estimated source position for the case. A 750 µCi Co-60 source 64 is displaced ten feet to the left of the line formed by the two detector arrays 60. The PDF shown in FIG. 13 identifies the source position to within a resolution of about one foot, i.e. the grid spacing of FIG. 13. Accordingly, position information of the source is obtainable using equation (28) by integrating the responses from a plurality of close-packed arrays 60.

Background radiation that exhibits a directional component rather than being substantially isotropic can also introduce directional error in a tight-packed array. FIG. 11 shows the background counts measured in a laboratory setting as a function of detector orientation angle where the counts have been shifted as in FIG. 9. The angular dependence in the figure arises from local "hot spots." If not corrected, background field non-uniformity introduces error in the estimated direction to the source. Table I shows the source direction error as a function of detector angle for the case where the local background observed at each array element for all array angles was set at the value measured for $\theta_{array}=0$, i.e. no angular dependence is included in background characterization. Significant error—as much as 15 degrees—occurs for the two weaker sources on the left side of the table. The strong barium source is only weakly affected because the source counts dominate the background counts. However, by compensating for background directionality source direction error can be significantly reduced. Table II, for example, presents source direction error when background characterization includes angular variation. The resulting error in the angle is accordingly reduced to a maximum of four degrees. In practice then a non-uniform background will introduce direction error that is larger the weaker the source.

TABLE I

Error in Direction to Source when Angular Dependence of Background is not Included

| Actual Angle (degrees) | Deviation from Actual Angle (degrees) | | |
|---|---|---|---|
| | Cs-137 (700 µCi) | Co-60 (746 µCi) | Ba-133 (14 mCi) |
| 0 | 0 | −1 | 0 |
| 15 | −12 | −7 | 0 |
| 30 | +1 | +1 | 0 |
| 45 | 0 | 0 | 0 |
| 60 | +3 | 0 | 0 |
| 75 | +15 | +5 | 0 |
| 90 | 0 | −1 | −1 |
| 180 | 0 | −1 | −1 |
| 270 | 0 | −1 | −1 |

TABLE II

Error in Direction to Source when Angular Dependence of Background is Included

| Actual Angle (degrees) | Deviation from Actual Angle (degrees) | | |
|---|---|---|---|
| | Cs-137 (700 µCi) | Co-60 (746 µCi) | Ba-133 (16 mCi) |
| 0 | 0 | 0 | 0 |
| 15 | −4 | −2 | 0 |
| 30 | −1 | −1 | 0 |
| 45 | −1 | −1 | 0 |
| 60 | −2 | −1 | 0 |
| 75 | +4 | −1 | 0 |
| 90 | −1 | −2 | −1 |
| 180 | −1 | −1 | −1 |
| 270 | −1 | −1 | −1 |

Figure 14:
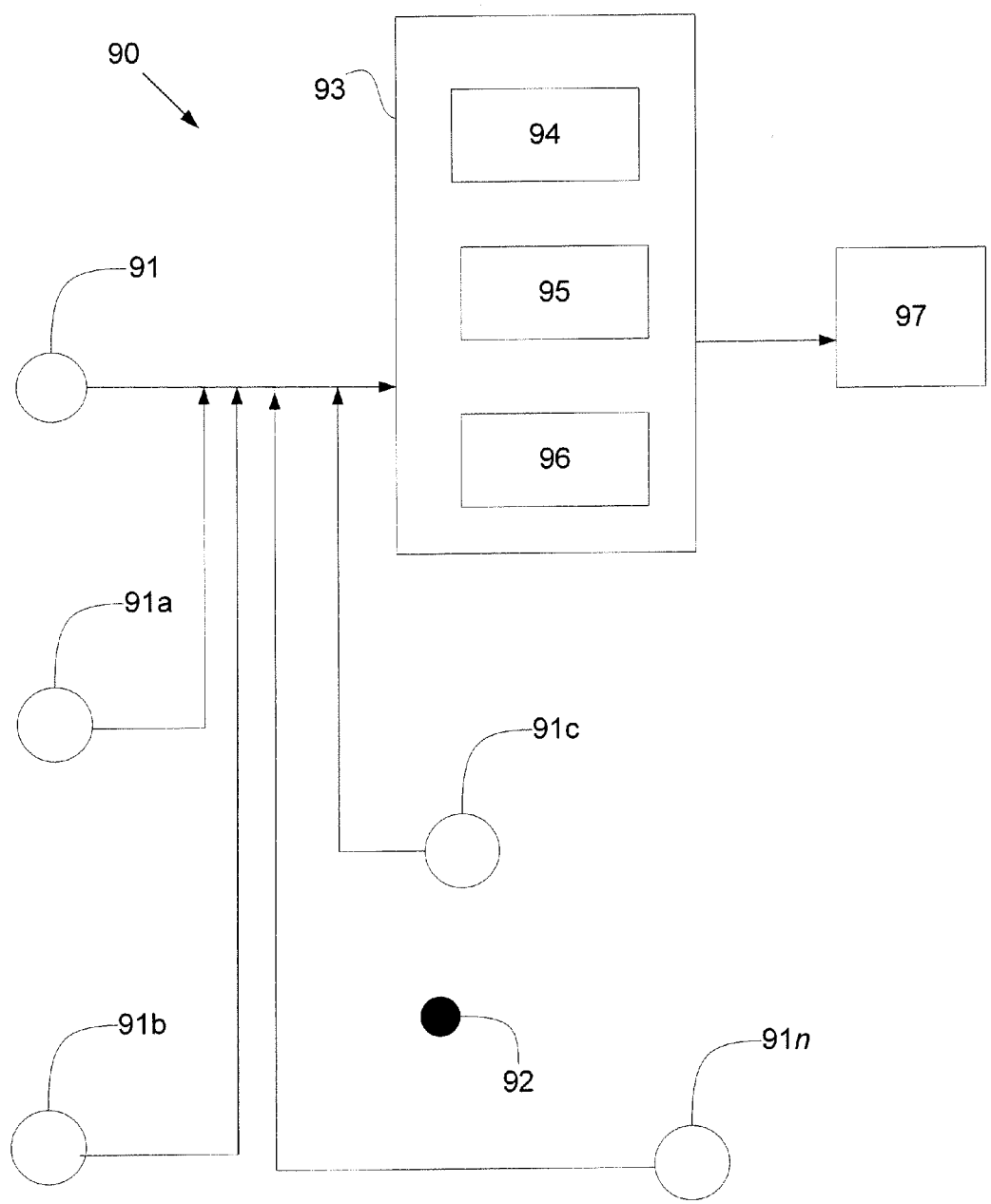
FIG. 14 is a schematic of a radiation detection system adapted to determine a probability of a location of a radiation source according to an embodiment of the present invention.

FIG. 14 depicts an architecture of a radiation detection system 90 according to the above treatment. The system 90 includes at least one directional detector 91, and as depicted, can include a plurality of directional detectors 91, 91a, 91b, 91c, . . . , 91n. Each of the plurality of directional detectors 91-91n, is configured to detect radiation counts from a source 92 at an unknown location within the environment and having an unknown energy. The plurality of directional detectors 91-91n may be at fixed positions dispersed within the environment and/or moveably positionable within the environment. Depending on the location of the source 92, the position of the various directional detectors 91-91n, and other effects such as shielding, not all of the plurality of directional detectors 91-91n may be positioned to acquire a useful signal from the source 92. The system 90 may include a combination of fixed and mobile detectors and may further include non-directional detectors positioned within the environment. However, the position and orientation of the detectors within the environment or with respect to a reference location are generally known.

Each of the directional detectors 91-91n are in communication with a processing unit 93. Communication between the directional detectors 91-91n may be conveniently achieved via various wireless and/or wired communication protocols known in the art. The processing unit 93 includes a memory portion 94, a processor portion 95, and an input/output portion 96. The processing unit 93 may be located within or remote from the environment. In various embodiments the processing unit 93 may comprise multiple distributed units. The processing unit 93 receives the radiation count information from each of the plurality of directional detectors 91-91n. The processing unit 93 further receives or is provided with information relating to each of the directional detectors 91-91n, for example, the position of the directional detector unit and the orientation of the directional detector unit in relation to the environment or other reference. The processing unit 93 may further receive and/or be provided with additional information, including information pertaining to the background radiation field within the environment, shielding conditions and shielding locations within the environment, information relating to various source characteristics, and other information such as information describing or defining the environment, including a Cartesian map of the environment.

As defined supra, the processing unit 93 is adapted to determine a probability of a direction to the source from the directional detector 91 or other reference location based on count data obtained from the detector 91 or another of the plurality of directional detectors 91-91n and information relating to the detector 91 or another of the plurality of directional detectors 91-91n. In embodiments comprising a plurality of directional detectors 91-91n, the processing unit 93 is adapted, as defined supra, to determine a probability of a direction for multiple detectors. A probability for a location of the source 92 can thus be determined by the processing unit 93 based on the directional estimates determined for two or more of the plurality of directional detectors 91-91n. In various embodiments, the processing unit 93 is configured to execute a computer readable program product. In a particular embodiment, the computer readable program product comprises the RadTrac program as described in U.S. Pat. No. 7,465,924, which is herein incorporated by reference in its entirety.

The processing unit 93 is in communication with an output unit 97 adapted to depict various information determined by the processing unit 93. In various embodiments, the output unit 97 may comprise an electronic display screen. The electronic display screen may be integral with the processing unit 93, coupled to and/or associated with the position of one or more of the plurality of directional detectors 91-91n, positioned remotely from the processing unit, and combinations thereof. The output unit 97 is configured to depict information indicative of a direction to the source and/or a location of the source relative to a reference position. In various embodiments, the output may include quantitative estimates for direction to the source, e.g. an angle from a reference position such as the position of a directional detector or other reference. The output may also comprise a quantitative estimate of the source location, e.g., x,y coordinates of the source relative to a reference position, and further provide an uncertainty associated with the location estimate of the source. The output may also comprise various graphical depictions indicative of the direction estimate and/or the location estimate of the source relative to a reference, e.g., a PDF.

The foregoing description of embodiments of the present invention have been presented for purposes of illustration and description. It is not intended to be exhaustive or to limit the present invention to the precise form disclosed, and modification and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A radiation detection system for obtaining a location of a radiation source within an environment, comprising:
at least one detector array including a plurality of directional detectors at least partially self-occluding in relation to the radiation source, the detector array positionable within an environment and angularly orientatable in relation to the environment, the plurality of directional detectors configured to detect gamma-ray radiation emitted from the radiation source at an unknown location within the environment and distal from the position of the plurality of directional detectors;
a processing unit in communication with the plurality of directional detectors and configured to receive radiation count data from the plurality of directional detectors, the processing unit adapted to determine a probability of a direction to the radiation source relative to the detector array based on the radiation count data obtained at a plurality of angles associated with the plurality of directional detectors; and
an output unit in communication with the processing unit, the output unit adapted to report information indicative of the probability of the direction to the radiation source relative to the position of the detector array;
wherein the at least one detector array comprises two or more detector arrays, the two or more detector arrays having an intersection of their respective directional radii such that direction and distance of the radiation source can be predicted by a probability surface given by, for an element i in array j denoted by $A_j$:

$$n_{A_j,i} - \frac{\eta_{A_j,i}(\overline{\theta}_{A_j})}{\eta_{A_j,0}(\overline{\theta}_{A_j})}(\eta_{A_j,0}(\overline{\theta}_{A_j})\lambda_{s-0}\Delta t + \eta_{A_j,0}(\overline{\theta}_{A_j})\lambda_{b-i}\Delta t)$$

where $\eta$ is a detector absolute efficiency,
n is the number of gamma rays which are counts registered by the detector element,
$\Delta t$ is a time interval over which these counts registered
$\lambda$ is in general the probability of a single emission per unit time, with $\lambda_{s-0}$ being the probability of a single emission per unit time from the radiation source and $\lambda_{b-i}$ being the probability of a single emission per unit time from all background sources local to element i in array j, and
$\overline{\theta}_{A_j}$ is the analog of $\overline{\theta}_D$, the angle of the ray from the detector array to the source.

2. The radiation detection system of claim 1, wherein the two or more detector arrays comprise r, where r is an integer greater than 1, with regard to the respective plurality of directional detectors, occluded detector arrays that are widely separated from each other, each occluded detector array comprising a tightly-pitched plurality of the plurality of directional detectors.

3. The radiation detection system of claim 2, wherein each of the r, tightly-pitched occluded detector array are rotatable about an axis, thereby selectively partially self-occluding at least one of the plurality of directional detectors.

4. The radiation detection system of claim 1, wherein the plurality of directional detectors are positionable within the environment and spaced apart from one another, each of the plurality of directional detectors in communication with the processing unit, the processing unit further adapted to integrate the count data from at least two of the plurality of detectors to determine a probability of a location of the radiation source relative to at least one of the plurality of directional detectors.

5. The radiation detection system of claim 4, wherein the probability of the location of the radiation source is determined by determining the intersection of the probability of the direction to the radiation source obtained from at least two of the plurality of directional detectors.

6. The radiation detection system of claim 4, wherein the output unit is adapted to report a graphical depiction of the probability of the location of the radiation source relative to a position of at least one of the plurality of detectors.

7. The radiation detection system of claim 6, wherein the position of at least one of the plurality of directional detectors is known in relation to the environment, and wherein the processing unit is adapted to determine the probability of the absolute location of the radiation source in relation to the environment.

8. The radiation detection system of claim 7, wherein the processing unit is further adapted to assess a spatially varying background radiation field present within the environment, and wherein the probability of the absolute location is adjusted for the spatially varying background radiation field.

9. The radiation detection system of claim 4, wherein the processing unit is further adapted to estimate the energy of the radiation source and wherein the processing unit is adapted to apply the estimated source energy to determine the probability of the location of the source.

10. The radiation detection system of claim 2 wherein the r tightly-pitched occluded arrays are substantially identical and have a probability surface is $$p = \prod_{j=0}^{r-1} \prod_{i=0}^{m-1} p_i(\eta_{A_0,0}(\bar{\theta}_{A_j})\lambda_{s-0}\Delta t, \eta_{A_0,0}(\bar{\theta}_{A_j})\lambda_{b-i}\Delta t, \eta_{A_0,i}(\bar{\theta}_{A_j})/\eta_{A_0,0}(\bar{\theta}_{A_j}) | n_i)$$

given by
where η is the detector absolute efficiency,
n is the number of gamma rays which are counts registered by the detector element,
p is the probability of registering these n counts
Δt is the time interval over which these counts registered
λ is in general the probability of a single emission per unit time, with $\lambda_{s-0}$ being the probability of a single emission per unit time from the radiation source and $\lambda_{b-i}$ being the probability of a single emission per unit time from all background sources local to element i in array j, and
$\bar{\theta}_{A_j}$ is the analog of $\bar{\theta}_D$, the angle of the ray from the detector array to the source.

11. A method for determining the location of a radiation source within an environment, comprising:
positioning within an environment at least one directional detector array having a plurality of detector elements configured to detect radiation emitted by a source disposed at an unknown location within the environment;
operating the at least one directional detector array at its position to partially occlude source radiation from at least one of the plurality of detector elements;
acquiring radiation counts for each of the detector elements of the at least one directional detector array;
processing the radiation counts from each of the detector elements with a processing unit to determine a probability density function for a direction to the source in relation to the position of the at least one directional detector array; and
outputting information indicative of the direction to the source relative to position of the at least one directional detector array via an output unit;
wherein the plurality of directional detector arrays have an intersection of their respective directional radii such that direction and distance of the radiation source can be predicted by a probability surface given by, for an element i in array j denoted by $A_j$:

$$n_{A_j,i} = \frac{\eta_{A_j,i}(\bar{\theta}_{A_j})}{\eta_{A_j,0}(\bar{\theta}_{A_j})}(\eta_{A_j,0}(\bar{\theta}_{A_j})\lambda_{s-0}\Delta t + \eta_{A_j,0}(\bar{\theta}_{A_j})\lambda_{b-i}\Delta t)$$

where η is a detector absolute efficiency,
n is the number of gamma rays which are counts registered by the detector element,
Δt is a time interval over which these counts registered
λ is in general the probability of a single emission per unit time, with $\lambda_{s-0}$ being the probability of a single emission per unit time from the radiation source and $\lambda_{b-i}$ being the probability of a single emission per unit time from all background sources local to element i in array j, and
$\bar{\theta}_{A_j}$ is the analog of $\bar{\theta}_D$, the angle of the ray from the detector array to the source.

12. The method of claim 11, wherein the at least one directional detector array comprises a plurality of directional detector arrays dispersed about the environment.

13. The method of claim 12, further comprising:
processing the radiation counts from each of the plurality of directional detector arrays with the processing unit to determine a probability density function for a respective direction to the source in relation to each of the plurality of directional detector arrays;
combining the probability density functions for each of the plurality of directional detector arrays to determine a probability for a location of the source within the environment; and
outputting information indicative of the position of the location of the source via the output unit.

14. The method of claim 13, wherein the information indicative of the position of the source comprises two dimensional coordinates representative of the most likely location of the source within the environment.

15. The method of claim 13, further comprising:
acquiring background radiation counts within the environment;
processing the background radiation counts with the processing unit to obtain a directionally dependant background radiation field of the environment; and
adjusting the probability of the location of the source based on the determined directionally dependant background radiation field of the environment.

16. The method of claim 11, wherein one or more of the at least one directional detector arrays comprises a neutron detector.

17. The method of claim 11, wherein the at least one directional detector array is fixedly positioned within the environment.

18. A nontransitory computer readable medium having instructions stored thereon, the instructions comprising:
instructions for receiving radiation count data from a plurality of directional detector arrays, each detector array having at least one partially occluded directional detector configured to detect radiation count data emitted by a source having a unknown location and unknown energy;
instructions for receiving detector array information, the detector array information including a position and an angular orientation of the at least one partially occluded directional detector with respect to the environment;
instructions for generating a probability density function of a direction to the source in relation to the position of the at least one directional detector based on the radiation count data and the detector information such that direction and distance of the radiation source can be predicted by a probability surface given by, for an element i in array j denoted by $A_j$:

$$n_{A_j,i} - \frac{\eta_{A_j,i}(\overline{\theta}_{A_j})}{\eta_{A_j,0}(\overline{\theta}_{A_j})} \left( \eta_{A_j,0}(\overline{\theta}_{A_j}) \lambda_{s-0} \Delta t + \eta_{A_j,0}(\overline{\theta}_{A_j}) \lambda_{b-i} \Delta t \right)$$

where $\eta$ is a detector absolute efficiency, n is the number of gamma rays which are counts registered by the detector element, $\Delta t$ is a time interval over which these counts registered $\lambda$ is in general the probability of a single emission per unit time, with $\lambda_{s-0}$ being the probability of a single emission per unit time from the radiation source and $\lambda_{b-i}$ being the probability of a single emission per unit time from all background sources local to element i in array j, and $\overline{\theta}_{A_j}$ is the analog of $\overline{\theta}_D$, the angle of the ray from the detector array to the source.

19. The nontransitory computer readable medium of claim 18, further comprising:

instructions for generating a probability density function of a direction to the source for each of the at least one directional radiation detectors wherein the at least one directional radiation detector comprises a plurality of directional radiation detectors dispersed about the environment;

instructions for generating a probability of a location of the source by processing each of the probability density functions; and outputting information representative of the location of the source in relation to the environment.

20. The nontransitory computer readable medium of claim 19, further comprising instructions for outputting information indicative of an uncertainty of the location of the source.

* * * * *